United States Patent Office 2,939,041
Patented May 31, 1960

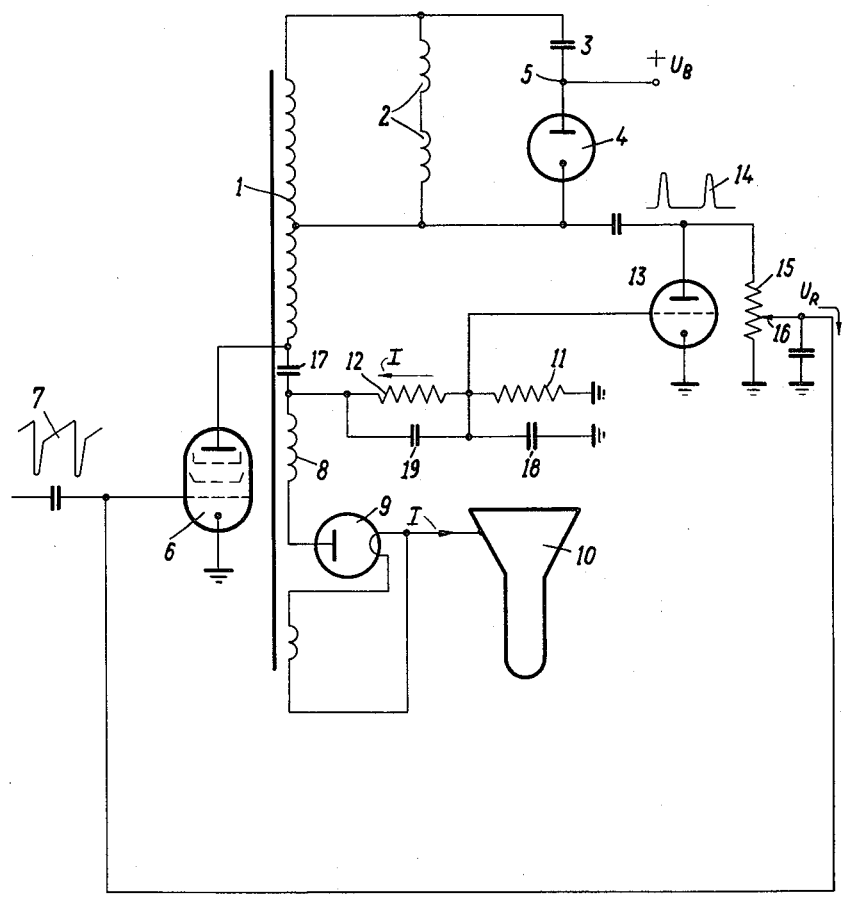

2,939,041
POWER SUPPLY FOR CATHODE RAY TUBES

Walter Bruch and Alfred Pollak, Hannover, Germany, assignors to Telefunken G.m.b.H., Berlin, Germany Filed Mar. 23, 1959, Ser. No. 801,040
Claims priority, application Germany Mar. 28, 1958
4 Claims. (Cl. 315—27)

The present invention relates to a system for generating high voltages for cathode ray tubes and, more particularly, to a circuit comprising a pulse transformer and an electronic switch in series for the generation of such high voltages.

High voltage circuits for the generation of the potentials necessary for cathode ray tube operation have in the past been loaded by the current of the beam itself, and variations in the load on the high voltage generating circuit resulted in distortions of the picture, such as breathing of the picture. In order to stabilize the high voltage generated for cathode ray tube operation, such high voltages have been generated by a pulse transformer and used after rectification for varying the internal resistance of an electronic switch which, generally, takes the form of a pentode. Further, it has also been suggested that a resistance in the cathode circuit of the cathode ray tube may be used to derive a potential which may be fed either directly or through an intermediate network to the control grid of the pentode switch.

It is an object of the present invention to provide a high voltage generating system which comprises a pulse transformer in which a resistor circuit is inserted between one end of the high voltage winding and ground for transmitting a control voltage.

It is another object of the invention to provide in a high voltage generator which comprises a pulse transformer, a resistor circuit consisting of a voltage divider between the low potential end of the high potential winding of the transformer and ground, the tap of the voltage divider being connected to the control grid of a phase inverter stage, preferably, a modulated amplifier.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

Referring now detail to the single figure of the drawing, which comprises a schematic circuit diagram of the horizontal deflection circuit of a television receiver, the reference character 1 designates an auto-transformer. Deflection coils 2 are shunted across a portion of the auto-transformer 1, and a series circuit comprising a capacitor 3 and a diode 4 is in parallel with the deflection coils 2. The diode 4 and the series circuit comprise a direct current restore circuit. A positive potential source designated $+U_B$ is connected to the junction 5 of the anode of the diode 4 and the capacitor 3. A driver stage 6, which is comprised of a pentode, has its anode connected to the transformer 1 and is periodically blocked and unblocked by the application of pulses, designated on Figure 1 by the reference character 7, to its control grid. When the tube 6 is conducting, a linearly rising current flows through the auto-transformer 1 and through the deflection coils 2. When the tube 6 is cut off, the current flow through the auto-transformer 1 and through the deflection coils 2 is interrupted. Thus, the oscillatory circuit formed by the deflection coils 2 and the distributed capacitances freely oscillates for half a cycle, due to the storage of energy in the magnetic circuit. At the end of the cycle, the diode 4 is unblocked so that a linear current may again flow through the deflection coils 2. This linearly increasing current flow is resumed when the tube 6 is again made conductive and continues until it is cut off once more. The half cycle of free oscillation produces a high potential in a high voltage coil 8 inductively coupled to the auto-transformer 1 and, after rectification by means of the diode 9, the high voltage is applied to a cathode ray tube 10. Due to the variations in the beam current which flows in the cathode ray tube 10, produced by modulation of the beam by an incoming signal, the loading upon the high potential source is varied, depending upon the picture content and, as a result, the high voltage itself is also modified thereby. In addition to variations in the beam current, the internal resistance of the high voltage source is also responsible to some extent for variations in the output high voltage. In order to maintain a high voltage as constant as possible in spite of variations in beam current, a voltage divider comprising resistors 11 and 12 is connected between ground at one end and the juction of a capacitor 17, which couples one end of the auto-transformer 1 and the anode of tube 6 to one end of the coil 8, with the high voltage coil 8 at the other end. The junction of the two resistors 11 and 12 is connected to the control grid of a stage 13 which has positive pulses applied to its anode during the return of the sweep generated by the line transformer . The output of the tube 13 is taken from its anode load resistor 15 across a capacitor and is applied to the control grid of the tube 6 to stabilize the bias upon said tube.

In order to insure that the beam current in the cathode ray tube 10 flows only to the voltage dividers 11 and 12, the coil of the pulse transformer 1 and the coil 8 are separated by the capacitor 17 to block direct current flow therebetween. When the beam current in the tube 10 is zero, no control voltage drop is generated across resistor 11 for application to the control grid of the tube 13, and the tube 6 has a substantially constant bias applied to its control grid. In this case, the high voltage applied to the cathode ray tube 10 is at a maximum. As soon as beam current flows to the cathode ray tube 10, the value of the high voltage output decreases, due to the voltage drop in the generator circuit. At the same time, however, a voltage drop is generated across resistor 11 by the beam current flowing therethrough and is applied to the control grid of tube 13. The output from the tube 13 causes a decrease in the negative bias potential applied to the control grid of the tube 6, increasing the current flow therethrough and decreasing its internal resistance. This results in an increase in the value of the high voltage output from the high potential winding 8.

It is desirable to take into consideration voltage variations caused by the ageing of the components and other variations in the overall circuit. To compensate for these variations, it may be advantageous to superimpose a pulse modulation upon the control voltage. This pulse modulation should be dependent upon the beam of the tube 10, so that the pulse modulation varies the operating point of the tube 13 in dependency upon the variations of the beam current in the tube 10. To provide this, capacitors 18 and 19 are respectively connected in parallel with the resistors 11 and 12, the values of these capacitors being dependent upon the amount of the pulse modulation desired. By proper proportioning of the voltage divider resistors 11 and 12 and the shunting capacitors 18 and 19, the internal resistance of the overall high voltage generator source may be adjusted within wide limits. In a practical example, which was tested in accordance with the principles of this invention, the circuit elements had the following values:

| | | |
|---|---|---|
| Resistor 11 | ohms | 56,000 |
| Resistor 12 | megohms | 1.5 |
| Condenser 17 | mmf | 33 |
| Tube 13 | EC | 92 |
| Resistance 15 | ohms | 100,000 |

This invention is not limited to the circuit illustrated by way of example in the drawing, but may also be used in circuits which incorporate normal pulse transformers in which the windings are completely separated. In that case, it is not necessary to provide a capacitor between the windings to prevent the flow of direct current therebetween, since the windings are normally maintained separate.

We claim:

1. A high voltage power supply for cathode ray tubes comprising a pulse transformer for generating high voltages, an electron switch connected to the input of said transformer for controlling the flow of energy therethrough, means for deriving a potential proportional to the current flow through said transformer and said switch, said means for deriving a potential comprising a voltage divider placed in the series current path between said transformer and said cathode ray tube and means responsive to variations in said derived potential to compensate for variations in the loading of said transformer and switch to maintain the output of said transformer substantially constant, said means responsive to the variations in said potential comprising an electronic valve having a control electrode and an output electrode, means for connecting said control electrode to said voltage divider, and means for connecting said output electrode to said electron switch to modify the conductive characteristics of said switch to compensate for changes in the loading of said transformer.

2. The power supply defined in claim 1, wherein said pulse transformer comprises an auto-transformer.

3. The power supply defined in claim 2, further including a direct current blocking means connecting the high voltage and low voltage portions of said transformer.

4. A high voltage power supply for cathode ray tubes comprising a pulse transformer having a low voltage input and a high voltage output, an electron switch comprising a first electronic valve having a first control electrode and a first output electrode, said output electrode being connected to the input of said transformer to control the flow of current therethrough, a voltage divider comprising a tap, said voltage divider being connected in the series current path between said transformer and a cathode ray tube load, a second electronic valve having a second control electrode and a second output electrode, means for connecting said second control electrode to the tap of said voltage divider whereby a first potential varying with the current output from said transformer is applied to said second control electrode to modify the current flow through said second valve, means for connecting said second output electrode to said first control electrode for applying to said first valve a second potential proportional to the amount of load current through said transformer to vary the conduction characteristics of said first valve to compensate for changes in said transformer load, and capacitors connected in parallel with each portion of said voltage divider to modify the time constants thereof and render the circuit pulse-responsive.

References Cited in the file of this patent

UNITED STATES PATENTS

| | | |
|---|---|---|
| 2,697,798 | Schlesinger | Dec. 21, 1954 |
| 2,726,340 | Nelson | Dec. 6, 1955 |
| 2,751,520 | Nelson | June 19, 1956 |
| 2,830,229 | Sonnenfeldt | Apr. 8, 1958 |
| 2,832,003 | Andrieu | Apr. 22, 1958 |